United States Patent [19]

Onishi et al.

[11] 4,315,139
[45] Feb. 9, 1982

[54] ELECTRIC RICE COOKER

[75] Inventors: Masayuki Onishi, Nagoya; Yoshiyuki Miwa, Aichi, both of Japan

[73] Assignee: Tokyo Shibaura Denki Kabushiki Kaisha, Kawasaki, Japan

[21] Appl. No.: 143,151

[22] Filed: Apr. 24, 1980

[30] Foreign Application Priority Data

May 22, 1979 [JP] Japan ................................ 54-63727
Jun. 1, 1979 [JP] Japan ................................ 54-69048

[51] Int. Cl.³ .................................................. F27D 11/02
[52] U.S. Cl. ................................ 219/441; 99/333; 219/438; 219/433; 219/492; 219/494
[58] Field of Search ............... 99/332, 333; 219/429, 219/430, 433, 438, 439, 441, 442, 492, 493, 494, 509, 510

[56] References Cited

U.S. PATENT DOCUMENTS

| | | | |
|---|---|---|---|
| 2,597,695 | 5/1952 | Braski et al. | 219/441 |
| 2,753,436 | 7/1956 | Schwaneke | 219/441 |
| 2,952,764 | 9/1960 | Minami | 219/441 X |
| 3,190,989 | 6/1965 | Komatsu | 219/441 X |
| 3,904,852 | 9/1975 | Rivelli et al. | 219/442 |

FOREIGN PATENT DOCUMENTS

| | | |
|---|---|---|
| 54-49264 | 9/1977 | Japan . |
| 54-93454 | 12/1977 | Japan . |
| 2025167 | 1/1980 | United Kingdom ............... 219/441 |

*Primary Examiner*—Volodymyr Y. Mayewsky
*Attorney, Agent, or Firm*—Cushman, Darby & Cushman

[57] ABSTRACT

An electric rice cooker with a kettle for containing rice, a heater for heating the kettle, a thermoswitch for deenergizing the heater in response to the temperature of the kettle, a timer for reenergizing the heater for controlling a twice cooking and which is operated for a predetermined time period, including the twice cooking time period, and a display for displaying the operation of the timer during the predetermined time period.

6 Claims, 7 Drawing Figures

ELECTRIC RICE COOKER

This invention relates to an electric rice cooker more particularly to an improvement of a timer for controlling twice cooking and a display for displaying the operation of the time.

It is well known that the best way to boil rice in a cooker of most excellent taste is to heat a cooking kettle and rice twice, namely "main cooking" and "twice cooking". Recently, a rice cooker with a timer has been developed. The timer of the rice cooker begins timer operation after the main cooking is finished and reheats the cooking kettle for a predetermined time period. However, the operator of the rice cooker doesn't know if the timer is working properly, for example, when the timer stops. Thus, the purpose of the timer for controlling the twice cooking is not fully attained.

It is an object of this invention to provide an electric rice cooker of which the operator can be easily seen if the time is working correctly.

It is another object of this invention to provide an electric rice cooker which has a display for displaying the operation of the timer.

It is a further object of this invention to provide an electric rice cooker which has a timer operated for a predetermined time period for reenergizing a heater to operate a twice cooking and has a display for displaying during the time period.

It is still a further object of this invention to provide an electric rice cooker which has a timer motor and has a display which is connected to a power source in parallel with the timer motor for displaying the time period of twice cooking.

This invention relates to an electric rice cooker having a cooking kettle for containing a rice, a heater for heating the kettle, a thermoswitch for deenergizing the heater, a timer for reenergizing the heater during a first predetermined time period for operating a twice cooking and a display for displaying the operation of the timer.

The exact nature of this invention as well as other objects and advantages thereof, will be readily apparent from consideration of the following detailed description of the drawings in which.

Figure 1:
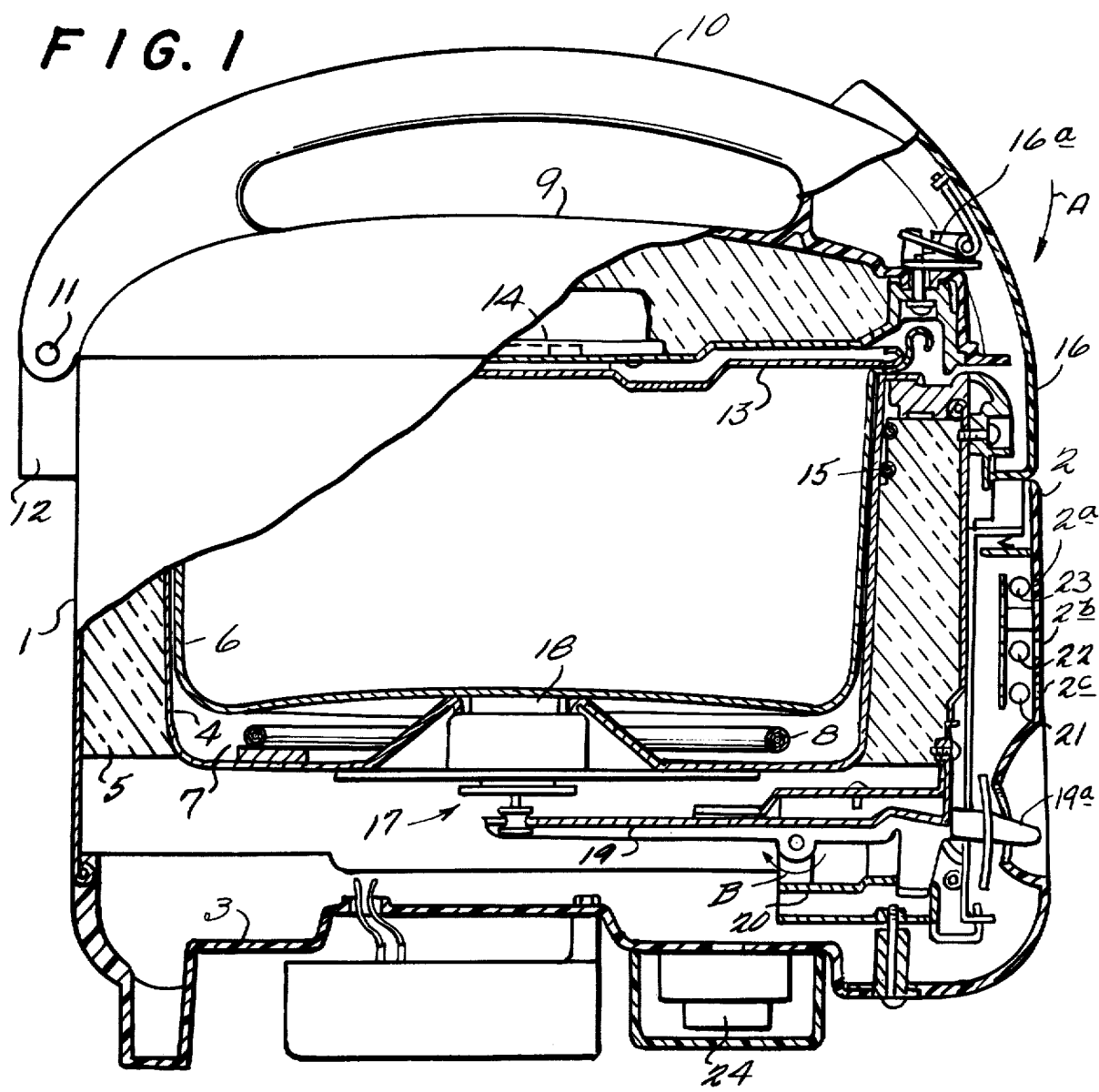
FIG. 1 is a partly fragmented sectional view of an electric rice cooker according to the first embodiment of this invention.
Figure 2:
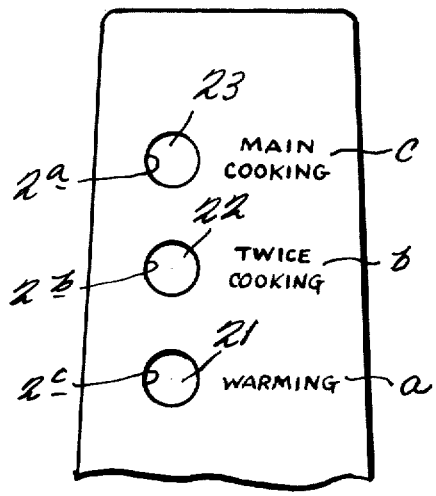
FIG. 2 is a enlarged view of a portion of a face cover according to the first embodiment of the invention.

Now there will be described a first embodiment of this invention according to FIG. 1 to FIG. 7. An outer case 1 is formed substantially cylindrical. A face cover 2 is mounted for covering a part of outer case 1, and a bottom frame 3 is mounted on the lower portion of outer case 1 and face cover 2. An inner case 4 is separated from the inside of outer case 1 by a heat insulator 5. A kettle 6 is detachably located in inner case 4 to form a predetermined space 7 therebetween. A sheathed heater 8 is located in space 7, namely in the bottom of inner case 4 for heating kettle 6. An outer lid 9 having a integrally molded handle 10 on its upper portion is pivotally mounted by a hinge 12 which is secured on the top of outer case 1 by a pivot 11. An inner lid 13 is secured to the inner surface of outer lid 9 for covering the opening of kettle 6. A lid heater 14 is mounted on inner lid 13 and a warming heater 15 is mounted about the outer surface of the upper portion of inner case 4. A lock lever 16 is pivotally mounted on the end portion of handle 10 and is usually urged by a coil spring 16a in the direction shown by arrow A (see FIG. 1).

Figure 3:
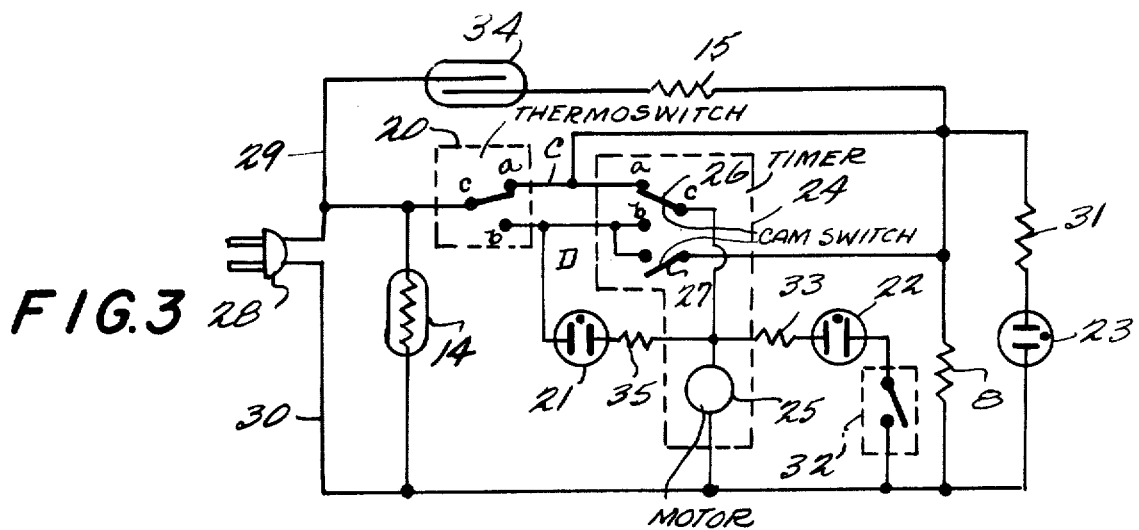
FIG. 3 is a wiring diagram of the electric rice cooker according to the first embodiment of the invention.
Figure 4:
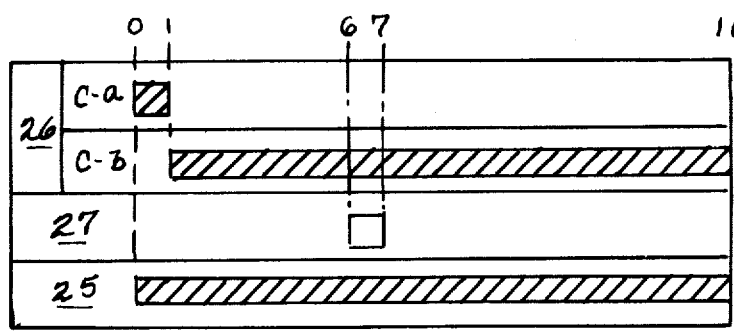
FIG. 4 is a timing chart of a timer according to the first embodiment of the invention.

A thermoswitch 17 for deenergizing heater 8 includes a magnetic thermosensor 18 mounted on inner case 4 and urged into contact with the outer surface of kettle 6 for detecting the bottom temperature P of kettle 6. One end of a operating lever 19 is connected to thermo-sensor 18, and a knob 19a is mounted on the opposite end of lever 19 and projects through face cover 2. A microswitch 20 is operated by lever 19. Thermosensor 18 includes a permanent magnet and a magnetic member which rapidly decreases its magnetic permeability at a predetermined temperature for example 130° C. Then, at room temperature, when lever 19 is rotated by knob 19a to the direction indicated by the arrow B, the permanent magnet holds the magnetic member for keeping the set position of lever 19 and a contact (c-a) of microswitch 20 is closed as shown in FIG. 3. At about the predetermined temperature, lever 19 is rotated to its reset position by a spring (not shown) because the magnetic attraction between the permanent magnet and the magnetic member vanishes and a contact (c-b) of microswitch 20 is closed. First, second and third display lamps 21, 22, and 23 are located in face cover 2 and are placed to face the outside from holes 2a, 2b and 2c. On face cover 2, a latter "a" of "warming", a letter "b" of "twice cooking" and a letter "c" of "main cooking" are printed corresponding to first, second and third display lamps 21, 22 and 23 respectively.

A timer 24 for operating the twice cooking is secured under bottom frame 3. When a timer motor 25 is energized, timer 24 repeats its predetermined (16 minutes in this embodiment) timer action according to one rotation of the shaft of timer motor 25. During the 16 minute cycle comprising one timer action of timer 24, a contact (c-a) of a cam switch 26 is closed for one minute at the beginning of the timer action and a contact (c-b) of switch 26 is closed 15 minutes and a cam switch 27 is closed for one minute after 5 minutes have passed from the beginning of the timer action (see FIG. 4). Referring to FIG. 3, one end of a plug 28 is connected to a line 29 and the other end thereof is connected to a line 30. Line 29 is connected to a main cooking line C through contact (c-a) of microswitch 20 and is connected to a twice cooking line D through contact (c-b) of microswitch 20. Heater 8 is connected between main cooking line C and line 30 and a series circuit of a current limiting resistance 31 and third lamp 23 is also connected therebetween in parallel with heater 8. Timer motor 25 is connected between movable contact (c) of switch 26 and line 30, and a series circuit of a current limiting resistance 33, second lamp 22 and a cooperating switch 32 which is linked for closing with contact (c-b) of switch 20 is also connected therebetween in parallel with timer motor 25. A series circuit of a thermostat 34 and warming heater 15 is connected in parallel with contact (c-a) of microswitch 20 and a series circuit of first lamp 21 and a current limiting resistance 35 is connected between movable contact (c) of switch 26 and line D.

Figure 5:
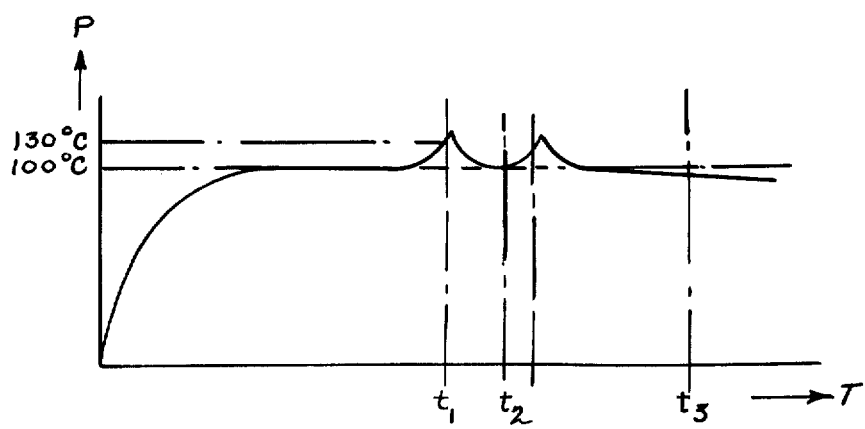
FIG. 5 shows a temperature-characteristic curve of the electric rice cooker according to the first embodiment of the invention.
Figure 6:
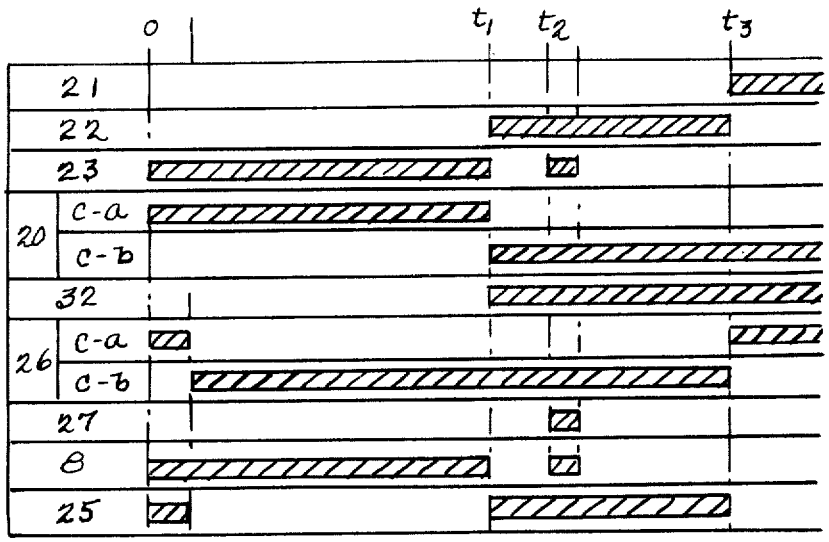
FIG. 6 is a timing chart of the electric rice cooker according to the first embodiment of the invention.

The operation of this invention will now be described referring to FIG. 1 to FIG. 6. FIG. 5 shows a temperature characteristic curve between cooking time T and the bottom temperature P of kettle 6. A predetermined quantity of rice and water corresponding to the quantity of rice are put into kettle 6. After loading kettle 6 into case 4, inner lid 13 and outer lid 9 close the opening of outer case 1 and kettle 6 by the rotation of outer lid 9 around pivot 11 as a fulcrum with handling handle 10. Then, outer lid 9 is kept in closed condition by lock lever 16. After plugging in plug 28, thermoswitch 17 is set by operating lever 19. Heater 8 is energized through contact (c-a) of microswitch 20 and main cooking line C. The bottom temperature P of kettle 6 and the contents thereof gradually rise by radiant heat from heater 8 and inner case 4. Then, main cooking continues and the bottom temperature P rises. At the same time of the beginning of the main cooking, timer 24 begins its timer action because timer motor 25 is energized through contact (c-a) of switch 26 and contact (c-a) of microswitch 20. After one minute from the beginning of the timer action, timer 24 stops its timer action temporarily because timer motor 25 is deenergized as a result of changing from contact (c-a) to contact (c-b) of camswitch 26. During main cooking, third lamp 23 is lit for displaying "main cooking" "C".

The bottom temperature P of kettle 6 is kept about 100° C. while the water in kettle 6 remains but suddenly rises higher than 100° C. when the water in kettle 6 is absorbed by rice or evaporated to the so-called dried up condition. Then, at about 130° C. of bottom temperature P at kettle time $t_1$ of FIG. 5 and FIG. 6, the magnetic attraction between the magnetic member and the permanent magnet vanishes because the magnet permeability of magnetic member of thermoswitch 18 decreases, and lever 19 is rotated to its reset position (opposite to the direction of arrow B). According to the reset of lever 19, the closing of contacts of microswitch 20 are changed from contact (c-a) to contact (c-b) for supplying the power source to "twice cooking" line D. Then, timer 24 resumes its timer action and heater 8 is deenergized, so that the main cooking is finished and a first ripening of rice is begun. After five minutes pass from the resumption of timer 24 (at time $t_2$ of FIG. 5 and FIG. 6), heater 8 is reenergized again for one minute for a "twice cooking" from twice cooking line D through switch 27 because switch 27 is closed for a predetermined time period, namely one minute, and after that, a second ripening of rice is begun. After fifteen minutes pass from the resumption of timer 24 (at time $t_3$ of FIG. 5 and FIG. 6), contact (c-b) of switch 26 opens and contact (c-a) thereof closes. Thus, one timer cycle is finished and timer 24 returns to the condition before cooking. During time period $t_1$ to $t_2$, timer motor 25 is reenergized and switch 32 closes with the closing of contact (c-b) of microswitch 20 so that second lamp 22 lights for displaying letter "b" of "twice cooking" through the first ripening, the twice cooking and the second ripening, and one minute after $t_2$, third lamp 23 again lights for displaying letter "c" of "main cooking".

After cooking has been finished, the boiled rice is kept warm by heaters 8 and 15 through thermostat 34 and by lid heater 14. At the same time of the beginning of the warming, second lamp 22 turns off and first lamp 21 turns on for displaying letter "a" of "warming" because first lamp 21 is energized in series with timer motor 25. In this condition, timer motor 25 does not operate because the terminal voltage thereof is not enough to cause operation.

In the foregoing embodiment, third lamp 23 is lit one minute while second lamp 22 is lit for displaying twice cooking. Thus, the operator can known whether ripening and twice cooking are doing well or not, and especially, can know the end of second ripening 10 minutes after lighting of third lamp 23. Further, second lamp 22 is not lit during one minute at the beginning of the timer 24 cycle because switch 32 is not closed while contact (c-a) of switch is closed, so that the time period of twice cooking is exactly displayed.

Figure 7:
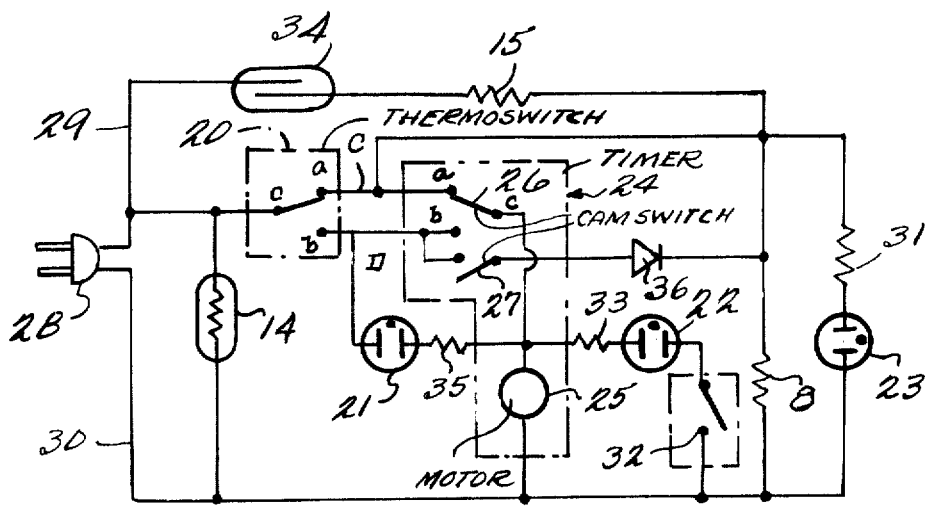
FIG. 7 is a wiring diagram of the electric rice cooker according to the second embodiment of the invention.

FIG. 7 shows the second embodiment of this invention in which a diode 36 is connected between switch 27 and heater 8. In this embodiment, the rice cannot burn and stick to the bottom of kettle 6 because heater 8 is energized with only half the energy during the "twice cooking" period used during the "main cooking period".

This invention is not restricted to the above mentioned embodiment. Many changes and modifications from the above embodiments can be carried out without departing from the scope of the invention, that scope being defined only by the scope of the appended claims.

What is claimed is:

1. An electric rice cooker for cooking rice in a cycle including at least main cooking and twice cooking steps comprising:

a cooking kettle for containing water and rice to be cooked;

a removable lid covering the top of said kettle;

thermally insulating frame means for supporting and enclosing said kettle;

electrical heater means mounted on said frame means adjacent the outside surface of said kettle for heating said kettle and the contents thereof;

circuit means for connecting and disconnecting said heater means from a source of electrical energy to carry out a plurality of cooking steps in a predetermined period including a thermoswitch for detecting the temperature of said kettle and having a first position connecting said source to said heater for heating said kettle and contents and a second position disconnecting said heater means in response to detection of a predetermined temperature, timer means having a first controlled switch in a first position connecting said timer means to said source through said thermoswitch to actuate said timer means when said thermoswitch is in said first position, said first switch being shifted to a second position by said timer means a first predetermined time after actuation to disconnect said timer means from said source and said timer means being reactuated when said thermoswitch is in said second position connecting said source to said timer means through said first switch in said second position and having a second controlled switch connecting said heater means to said source through said thermoswitch in said second position for a second predetermined time period beginning a third predetermined time after reactivation of said timer means; and means for displaying the steps of said cycle being carried out including a first display lamp connected to said thermoswitch for illumination when said thermoswitch is in said first position to indicate main cooking, and a serially connected third switch controlled by said timer means and a second display lamp, said second lamp and third switch being connected in parallel with said timer means, said third switch being closed when said second switch is in said second position for illumination of said second lamp to indicate twice cooking.

2. A cooker as in claim 1, wherein said frame includes an inner and outer case and insulation between said cases.

3. A cooker as in claim 2, wherein said timer means includes a motor for operating said first and second controlled switches, said motor being mounted in the bottom on said inner case.

4. A cooker as in claim 1, wherein said first lamp is connected in parallel with said heater means for illumination whenever said heater means is heating.

5. A cooker as in claim 1, further including a diode for connecting said heater to said source through said third switch during twice cooking.

6. A cooker as in claim 1, further including a third display lamp connected to said thermoswitch, said first switch second position, and said motor, said first switch shorting said third lamp when in said second position and said thermoswitch connecting said third lamp in series with said motor in said second position for illumination of said third lamp to indicate warming.

* * * * *